United States Patent
Takamura et al.

(10) Patent No.: US 10,110,100 B2
(45) Date of Patent: Oct. 23, 2018

(54) ELECTRIC MOTOR

(71) Applicants: Mitsuba Corporation, Gunma (JP); Webasto SE, Stockdorf (DE)

(72) Inventors: Yuichi Takamura, Gunma (JP); Masaya Ota, Gunma (JP); Toyohisa Harada, Gunma (JP); Susumu Okochi, Gunma (JP); Werner Lissner, Starnberg (DE); Bernhard Meier, Kirchheim (DE)

(73) Assignee: Mitsuba Corporation, Kiryu-shi, Gunma (JP)

( * ) Notice: Subject to any disclaimer, the term of this patent is extended or adjusted under 35 U.S.C. 154(b) by 280 days.

(21) Appl. No.: 14/915,776

(22) PCT Filed: Sep. 2, 2014

(86) PCT No.: PCT/JP2014/073013
§ 371 (c)(1),
(2) Date: Mar. 1, 2016

(87) PCT Pub. No.: WO2015/033913
PCT Pub. Date: Mar. 12, 2015

(65) Prior Publication Data
US 2016/0197538 A1    Jul. 7, 2016

(30) Foreign Application Priority Data

Sep. 6, 2013  (JP) .................................. 2013-185085

(51) Int. Cl.
*H02K 5/16*       (2006.01)
*H02K 11/40*      (2016.01)
(Continued)

(52) U.S. Cl.
CPC ............. *H02K 13/10* (2013.01); *H02K 5/161* (2013.01); *H02K 11/02* (2013.01); *H02K 11/40* (2016.01); *H02K 7/081* (2013.01)

(58) Field of Classification Search
CPC .......... H02K 5/161; H02K 7/08; H02K 7/081; H02K 7/083; H02K 11/40; H02K 11/02;
(Continued)

(56) References Cited

U.S. PATENT DOCUMENTS 5,099,163 A  *  3/1992  Zenmei .................. H02K 5/148
                                                       310/239
5,838,081 A  *  11/1998  Greentaner .......... H02K 5/1672
                                                        310/89
(Continued)

FOREIGN PATENT DOCUMENTS

CN    1921265 A     2/2007
CN    102106065 A   6/2011
(Continued)

OTHER PUBLICATIONS

Niki et al., Machine Translation of JP2010057298, Mar. 2010.*
(Continued)

*Primary Examiner* — Thomas Truong
*Assistant Examiner* — Eric Johnson
(74) *Attorney, Agent, or Firm* — McCormick, Paulding & Huber LLP

(57) ABSTRACT

An object of the present invention is to provide an electric motor which can prevent electric noise generated from a contact between a brush and a commutator from being radiated and diffused to the outside. An electric motor comprises: an armature shaft 28; a coil 29b attached to the armature shaft 28; a commutator 30 attached to the armature shaft 28, and electrically connected to the coil 29b; a brush through which an electric current is supplied to the com- (Continued)

mutator 30; a conductive shaft bearing 35 configured to rotatably support the armature shaft 28; a yoke 26 incorporated with the shaft bearing 35, and electrically connected to a ground conductor; a conductive shaft bearing 34 arranged in a direction along a center line of the armature shaft 28, different in position from the shaft bearing 35, and configured to rotatably support the armature shaft 28; and a contact plate 51 electrically connected to the shaft bearing 34, and electrically connected to the ground conductor.

5 Claims, 10 Drawing Sheets

(51) Int. Cl.
    *H02K 13/10*         (2006.01)
    *H02K 11/02*         (2016.01)
    *H02K 7/08*          (2006.01)

(58) Field of Classification Search
    CPC ........ H02K 13/10; H02K 5/225; H02K 13/00; H02K 13/006
    USPC ............ 310/90, 71, 238, 239, 240–252
    See application file for complete search history.

(56) References Cited

U.S. PATENT DOCUMENTS

| | | |
|---|---|---|
| 2001/0017495 A1 | 8/2001 | Sato et al. |
| 2002/0047468 A1* | 4/2002 | Lee ........................ H01R 39/39 310/239 |
| 2004/0060766 A1* | 4/2004 | Hayakawa ........... B62D 5/0406 180/444 |
| 2004/0189117 A1* | 9/2004 | Hama .................... H02K 5/148 310/71 |
| 2013/0119799 A1* | 5/2013 | Honda ............... H02K 11/0094 310/71 |

FOREIGN PATENT DOCUMENTS

| | | | |
|---|---|---|---|
| CN | 202455235 U | 9/2012 | |
| JP | S58-19140 A | 2/1983 | |
| JP | H01-268436 A | 10/1989 | |
| JP | H05-244751 A | 9/1993 | |
| JP | 2001-320849 A | 11/2001 | |
| JP | 2002136041 A * | 5/2002 | ............. H01R 39/24 |
| JP | 2007-89388 A | 4/2007 | |
| JP | 2010-57298 A | 3/2010 | |
| JP | 2010-57299 A | 3/2010 | |
| JP | 2011078279 A | 4/2011 | |
| JP | 2012-222942 A | 11/2012 | |

OTHER PUBLICATIONS

Fukuda et al., Machine Translation of JP58019140, Feb. 1983.*
Arai et al., Machine Translation of JP2012222942, Nov. 2012.*
International Search Report for PCT Serial No. PCT/JP2014/073013 dated Nov. 18, 2014.

* cited by examiner

ELECTRIC MOTOR

CROSS REFERENCE TO RELATED APPLICATION

Applicant hereby claims foreign priority benefits under U.S.C. § 119 from International Patent Application Serial No. PCT/JP2014/073013 filed on Sep. 2, 2014 and Japanese Patent Application Serial No. 2013-185085 filed on Sep. 6, 2013, the contents of which are incorporated by reference herein.

TECHNICAL FIELD

The present invention relates to an electric motor which rotates an armature shaft when an electric current is supplied from brushes to a commutator.

BACKGROUND

Conventionally, an electric motor with brushes has been known as a power source for in-vehicle equipment, and one example thereof is described Japanese Patent Application Laid-Open Publication No. 2010-57299. The electric motor described in Japanese Patent Application Laid-Open Publication No. 2010-57299 is used for a sunroof apparatus of a vehicle, and the electric motor is provided with an armature which is located inside a yoke having a bottomed cylindrical shape. The armature has an armature shaft, and the armature shaft is rotatably supported inside the yoke via shaft bearings. An armature core and a commutator are attached to the armature shaft. Furthermore, a plurality of armature coils are wound around the armature core, and the end portions of the armature coils are connected to the commutator. Furthermore, a brush holder is attached to an opening end of the yoke, and a pair of brushes is attached to the brush holder. The paired brushes make electrical contact with an outer periphery of the commutator. Furthermore, power supply terminals are connected to the paired brushes, and the power supply terminals are connected to connection members of a control board. The control board has a control circuit for controlling an electric current to be supplied to the commutator via the brushes.

On the other hand, a casing is fixed to the opening end of the yoke, and a worm wheel is provided in the casing and rotated integrally with an output shaft. An outer periphery of the worm wheel is formed with a gear. One end portion of the above-mentioned armature shaft is disposed inside the casing, and the outer periphery of this end portion of the armature shaft is formed with a worm. This worm is engaged with the gear formed on the outer periphery of the worm wheel. In addition, a grounding terminal serving as an earth terminal is formed on the casing, and by the grounding terminal, the control circuit of the control board is earthed (grounded) to the yoke so that the resistance of the control circuit is enhanced with respect to electric noise.

SUMMARY

As described in Japanese Patent Application Laid-Open Publication No. 2010-57299, in the electric motor in which an electric current is supplied to the commutator via the brushes, an electric spark tends to be generated from the contact between the brushes and the commutator to cause electric noise. However, since the electric motor described in Japanese Patent Application Laid-Open Publication No. 2010-57299 does not take electric noise to be caused at the contact between the brushes and the commutator into consideration, and the above electric motor still leaves room for improvement.

An object of the present invention is to provide an electric motor which can suppress electric noise from being radiated from the contact between the brushes and the commutator.

An electric motor according to the present invention comprises: an armature shaft; a coil attached to the armature shaft; a commutator attached to the armature shaft, and electrically connected to the coil, a brush which makes electrical contact with the commutator, and through which electric current is supplied to the commutator; a first electrically-conductive shaft bearing configured to rotatably support the armature shaft; a first grounded member incorporated with the first shaft bearing, and electrically connected to a ground conductor; a second electrically-conductive shaft bearing arranged in a direction along a center line of the armature shaft, different in position from the first shaft bearing, and configured to rotatably support the armature shaft; and a second grounded member electrically connected to the second shaft bearing, and electrically connected to the ground conductor.

In the electric motor according to the present invention, the coil and the commutator are arranged between the first and second shaft bearings in a direction along the center line.

The electric motor according to the present invention further comprises: a yoke in which the armature shaft, the coil, the commutator, the first shaft bearing, and the second shaft bearing are housed; and a brush holder housed in the yoke, and configured to retain the brush, wherein the first shaft bearing is supported by the yoke, and the second shaft bearing is supported by the brush holder, and wherein the first grounded member is the yoke, and the second grounded member is supported by the brush holder.

The electric motor according to the present invention further comprises: a rotating shaft axially aligned with the armature shaft, and coupled to the armature shaft so that the armature shaft can transmit drive power to the rotating shaft; and a storage space which is formed by the casing, and in which a control board configured to control electric current to be supplied to the brush is housed, wherein the storage space is arranged at a position shifted from a position between the first and second shaft bearings in a direction along the center line.

In the electric motor according to the present invention, the second grounded member has: an annular unit formed so as to surround the second shaft bearing; a plurality of internal contact terminals formed on the inner side of the annular unit, and electrically connected to the second shaft bearing; and a plurality of external contact terminals formed on the outer side of the annular unit, and electrically connected to the ground conductor.

According to the present invention, electric noise (electric charge) radiated to the armature shaft from the contact between the brushes and the commutator can be released to the ground via the first grounded member and the second grounded member which are parallel to each other. Therefore, it is possible to suppress electric noise from being radiated around the electric motor.

According to the present invention, it is possible to suppress electric noise from being radiated outward from an area between the first shaft bearing and the second shaft bearing in a direction along the center line of the armature shaft.

According to the present invention, since the yoke originally provided functions as an element for releasing electric noise of the armature shaft to the ground, it is not necessary to provide a dedicated first grounded member. In addition, since the second grounded member is supported by the brush holder, it is not necessary to provide a dedicated element for supporting the second grounded member.

According to the present invention, since a housing chamber is arranged at a position shifted from a position between the first shaft bearing and the second shaft bearing in the direction along the center line, electric noise is prevented from being radiated in the housing chamber.

According to the present invention, since the second grounded member is provided with an annular portion which is formed so as to surround the second shaft bearing, it is not necessary to provide a dedicated area for the second grounded member.

DETAILED DESCRIPTION

Figure 1:
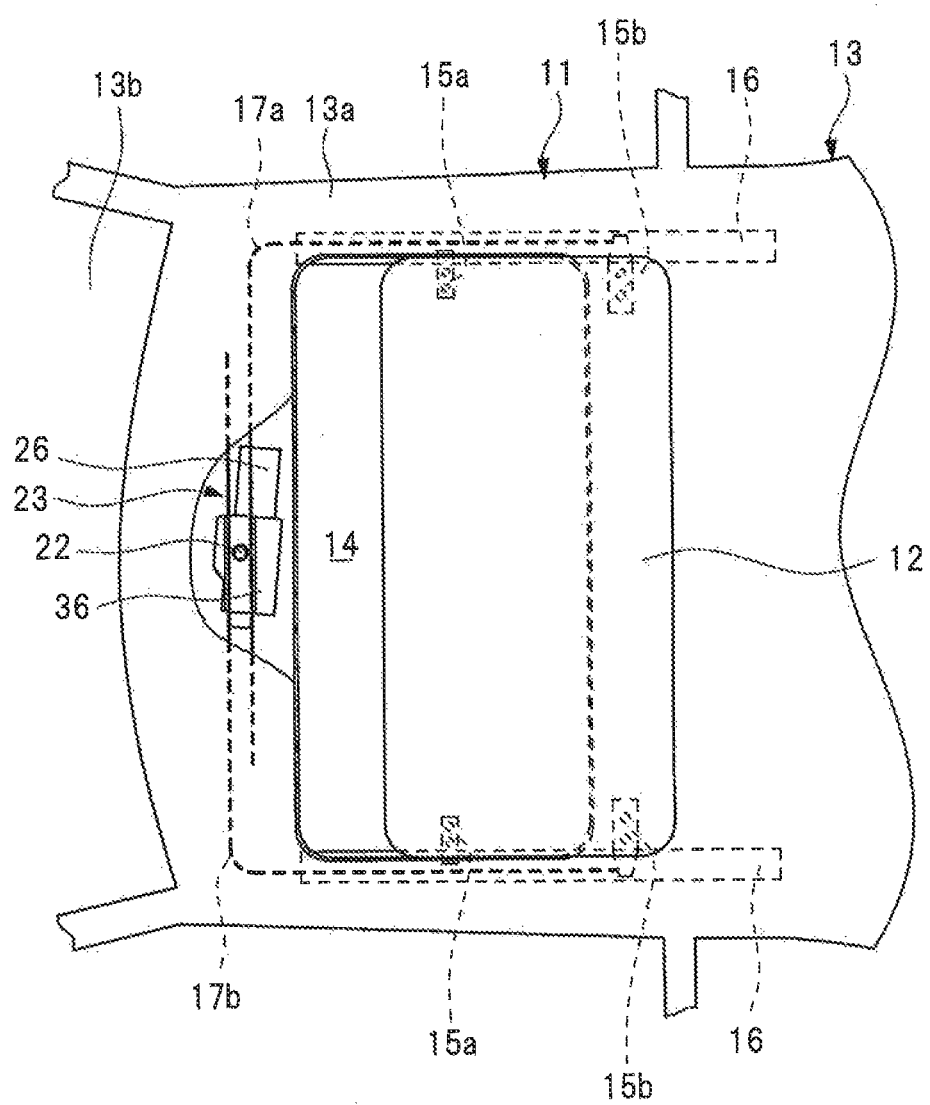
FIG. 1 is a plan view showing an example of an electric motor of the present invention which is used in a sunroof apparatus of a vehicle.

Hereinafter, embodiments of the present invention will be explained in detail with reference to accompanying drawings. FIG. 1 is a plan view showing a sunroof apparatus 11 provided on a roof 13a of a vehicle 13. The roof 13a extends in a substantially horizontal direction, or it is a gently-curved plate extending in a horizontal direction. The roof 13a is formed with an opening 14 which has a substantially-rectangular shape in a plan view, and through which the inside of the vehicle 13 is communicated with and the outside of the vehicle 13. The sunroof apparatus 11 is provided with a roof panel 12, and the opening 14 is opened/closed by movement of the roof panel 12 in a longitudinal direction of the vehicle 13. The longitudinal direction of the vehicle 13 corresponds to the lateral direction in FIG. 1.

Two pair of shoes 15a and 15b are respectively secured to end portions of the roof panel 12 in a lateral direction of the vehicle 13. The lateral direction of the vehicle 13 corresponds to the vertical direction in FIG. 1. The paired shoes 15a and 15b are disposed in the longitudinal direction of the vehicle 13. Each paired shoes 15a and 15b has rollers and the like (not shown). On the other hand, linear guide rails 16 extending in the longitudinal direction of the vehicle 13 are secured to respective sides of the opening 14 in the lateral direction of the vehicle 13. By allowing the rollers of the paired shoes 15a and 15b to roll along the guide rails 16, the roof panel 12 can be moved in the longitudinal direction of the vehicle 13.

In addition, an electric motor 23 for use in moving the roof panel 12 in the longitudinal direction of the vehicle 13 is provided on the roof 13a. More specifically, a front glass 13b is located in front of (left side in FIG. 1) the opening 14 in the longitudinal direction of the vehicle 13, and the electric motor 23 is disposed between the opening 14 and the front glass 13b. Furthermore, the sunroof apparatus 11 is provided with two cables 17a and 17b made of metal material (metal).

In addition, the cable 17a is coupled to the shoe 15b disposed on the right part of the vehicle 13, and the cable 17b is coupled to the shoe 15b disposed on the left part of the vehicle 13. Of the cables 17a and 17b, portions located in front of the opening 14 in the longitudinal direction of the vehicle 13 are parallel to each other, and extends in the lateral direction of the vehicle 13 along the opening 14. The remaining portions of the cables 17a and 17b are disposed along the longitudinal direction of the vehicle 13 on the respective sides of the opening 14. That is, each of the cables 17a and 17b is bent into a substantially L-letter shape in a plan view.

The electric motor 23 is a power source for generating drive power for use in pushing/drawing the cables 17a and 17b, and has a structure shown in FIGS. 2 to 5. The electric motor 23 is provided with a yoke 26, a plurality of permanent magnets 27, an armature shaft 28, and an armature 29. The yoke 26 is formed into a cylindrical shape, integrally formed with a bottom, and made of metal material having conductivity. The yoke 26 has: a cylinder portion 26a; a bottom portion 26b integrally formed with one end in a direction along the center line "A" of the cylinder portion 26a; and a flange portion 26c extending outward from an opening end of the cylinder portion 26a. The flange portion 26c is formed with holes 26d.

In addition, the permanent magnets 27 are attached to an inner periphery of the yoke 26 along its circumferential direction. The armature shaft 28 is located inside the yoke 26, and made of conductive metal material. The armature 29 is located inside the yoke 26, and attached to the armature shaft 28. The armature 29 is provided with: an armature core 29a; and a plurality of coils 29b wound around the armature core 29a. In addition, a commutator 30 is attached to the armature shaft 28, and electrically connected to the coils 29b. The armature 29 is disposed between the bottom portion 26b of the yoke 26 and the commutator 30 in the direction along the center line "A".

Figure 6:
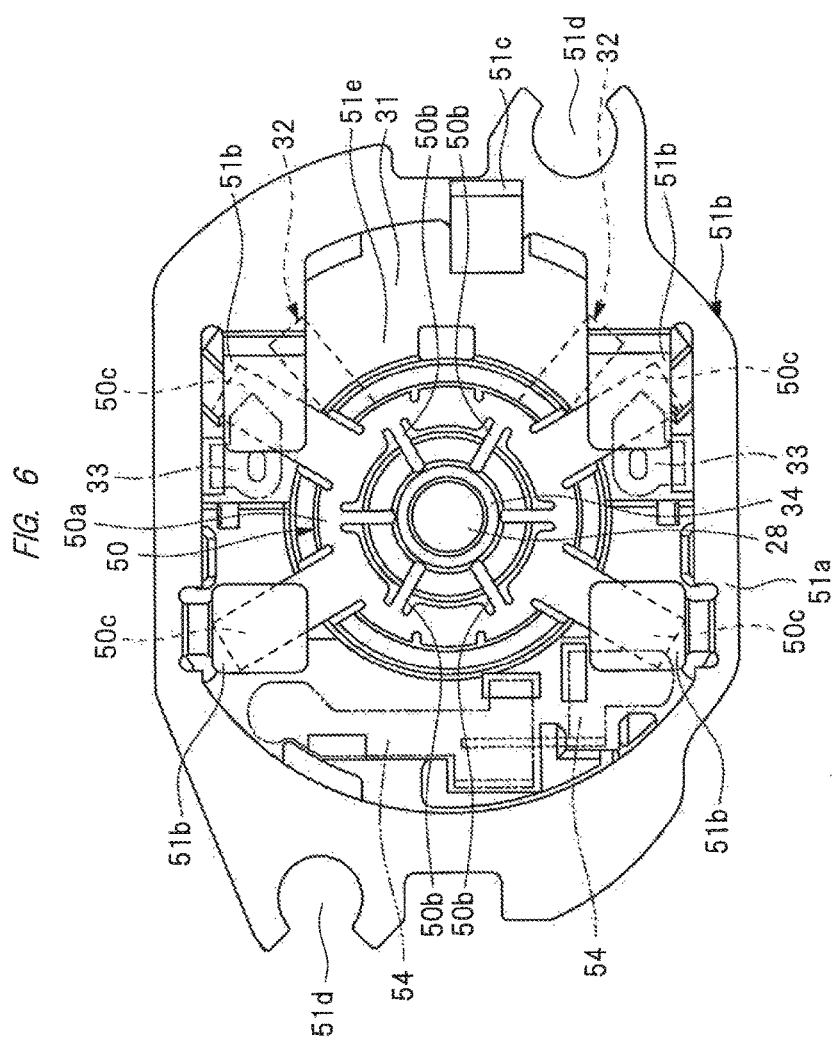
FIG. 6 is a side view showing a main section of the electric motor of the present invention.

A brush holder 31 is provided inside the yoke 26. In the direction along the center line "A", an occupied area of the brush holder 31 has a partially overlap with that of the commutator 30. The brush holder 31 is formed along an outer periphery of the commutator 30 so as to surround the commutator 30. The brush holder 31 is provided with: a concave portion 31e in which the commutator 30 is provided; and a shaft hole 31b which is communicated with the concave portion 31e. The brush holder 31 is integrally molded of resin, and as shown in FIG. 6, two brushes 32 for supplying electric current to the commutator 30 are attached to the brush holder 31.

A spring (not shown) is attached to the brush holder 31, and the brushes 32 are pushed by the spring so as to make electrical contact with the commutator 30. In addition, the brush holder 31 is provided with: two choke coils (not shown); two capacitors (not shown); two brush-side terminals 33; and two power-supply-side terminals 54. The power-supply-side terminals 54 are terminals for use in supplying electric power to the brushes 32, and electrically connected to the brushes 32 via the choke coils in the brush holder 31. Each of the brush-side terminals 33 has a contact portion which makes electrical contact with the yoke so that those terminals are electrically grounded via the contact portions, and those terminals are electrically connected between the power-supply-side terminal 54 and the choke coil via a capacitor.

On the other hand, one portion of the armature shaft 28 in the direction along the center line "A" is disposed in the concave portion 31e and the shaft hole 31b. A shaft bearing 34 is attached to an inner periphery of the shaft hole 31b, and one end of the armature shaft 28 is supported by the shaft bearing 34. In contrast, a shaft bearing 35 is attached to the bottom portion 26b of the yoke 26, and the other end of the armature shaft 28 is supported by the shaft bearing 35. That is, the armature shaft 28 is located on the center line "A", and rotatably supported by the shaft bearings 34 and 35 disposed at respective positions different from each other in the direction along the center line "A". The shaft bearings 34 and 35 are made of metal material having conductivity.

Figure 2:
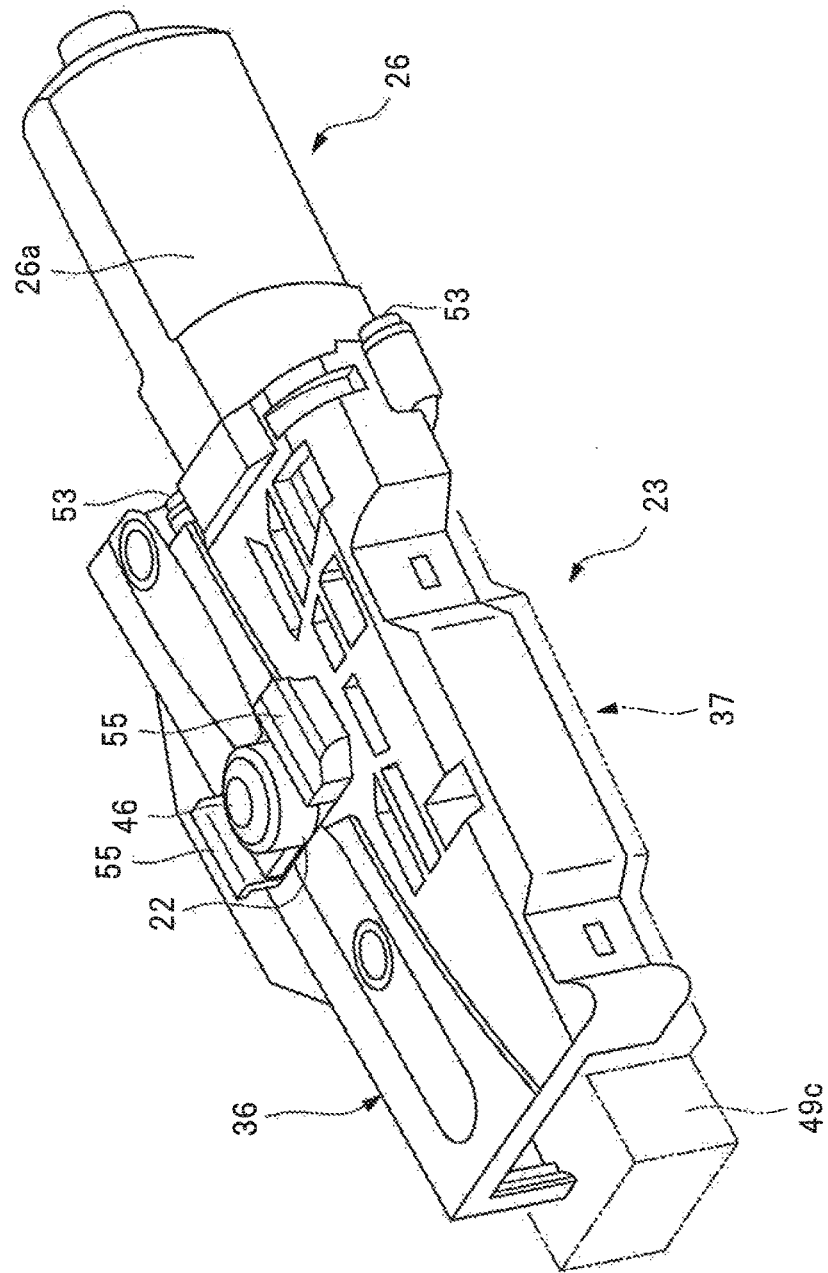
FIG. 2 is a perspective view showing the electric motor of the present invention.
Figure 3:
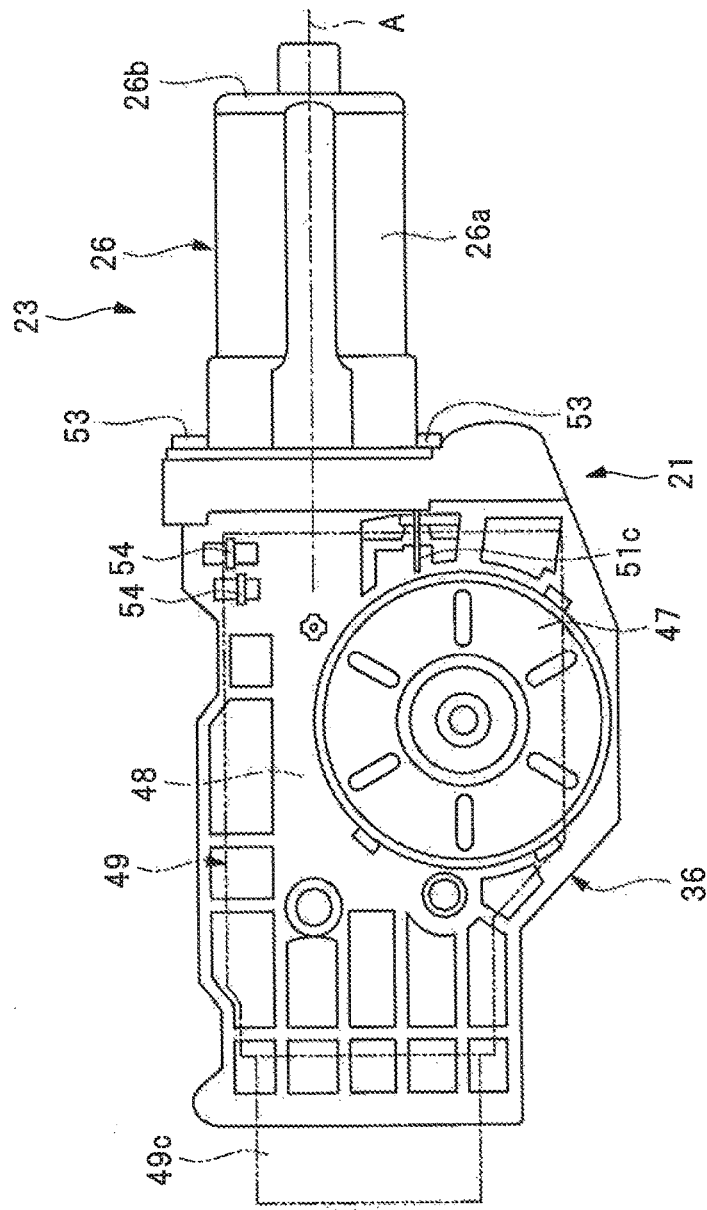
FIG. 3 is a bottom view of the electric motor of the present invention.
Figure 4:
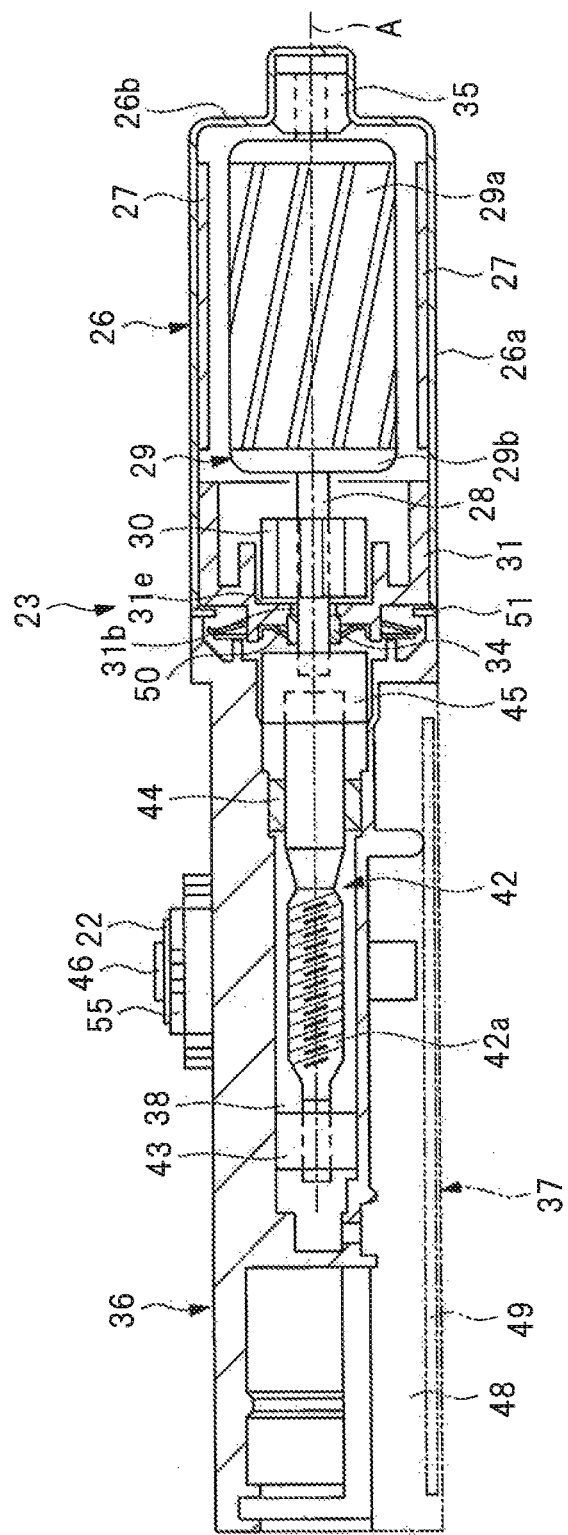
FIG. 4 is a front cross-sectional view of the electric motor of the present invention.
Figure 5:
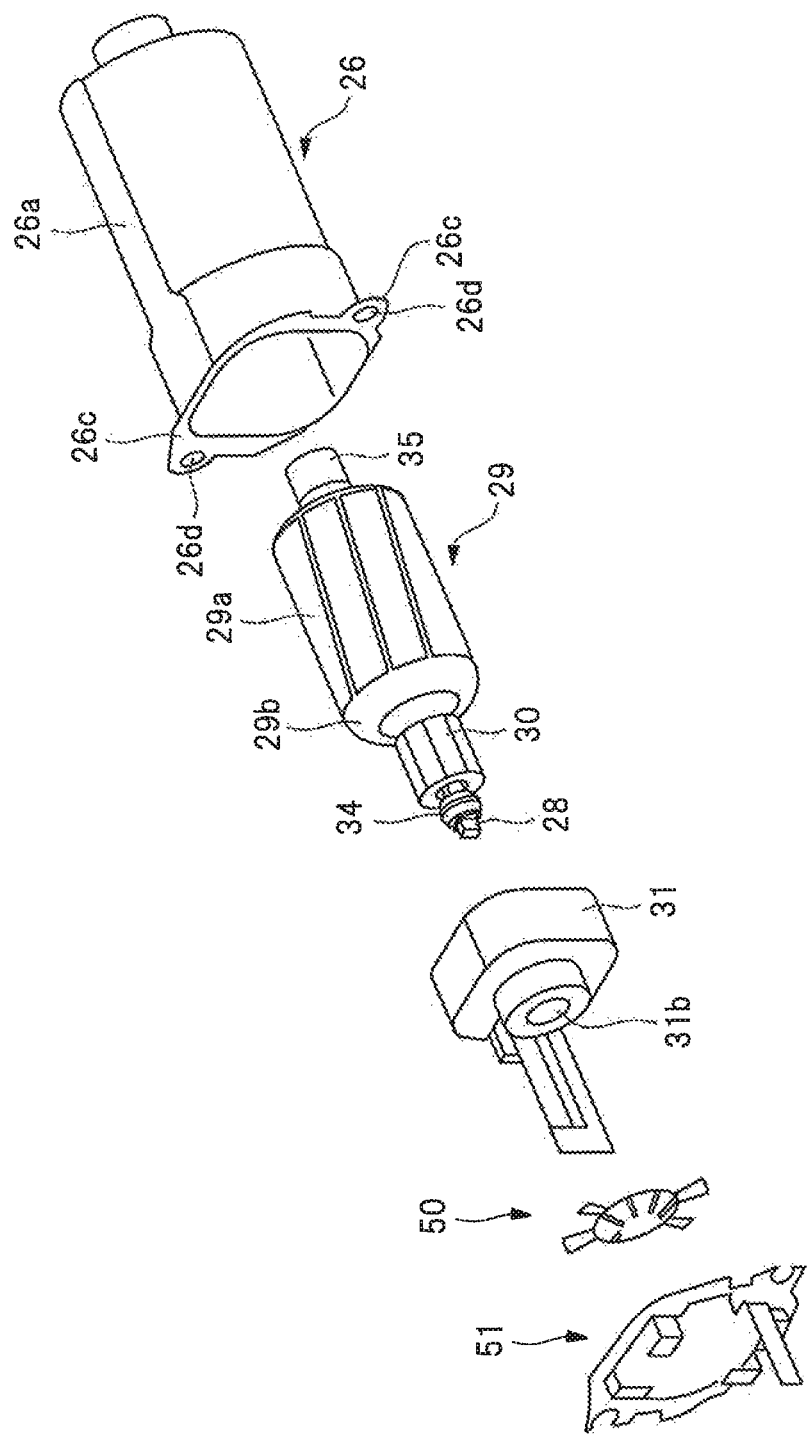
FIG. 5 is an exploded perspective view of the electric motor of the present invention.
Figure 8:
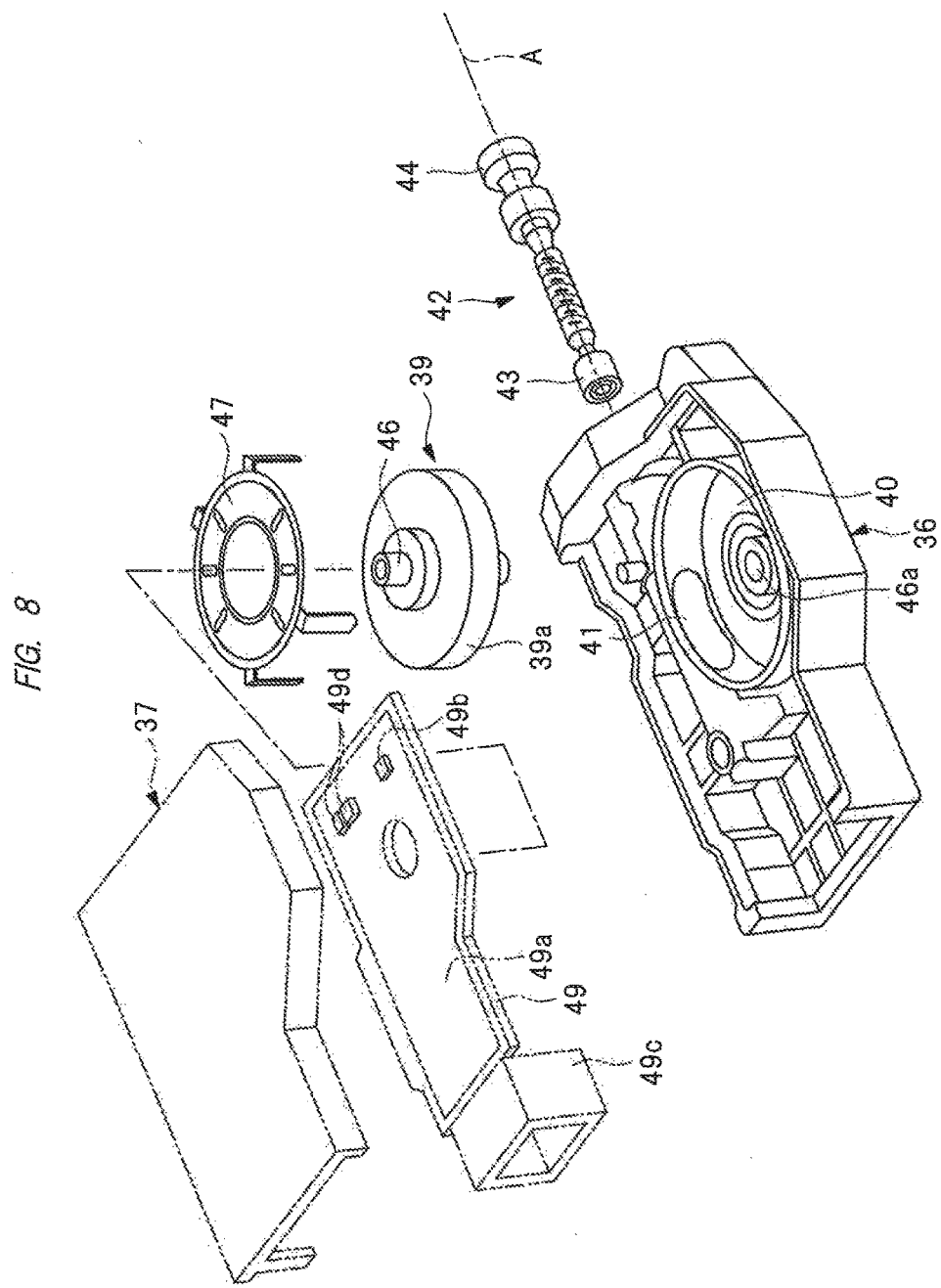
FIG. 8 is a partially exploded perspective view of the electric motor of the present invention.

On the other hand, as shown in FIGS. 2, 4, and 8, the electric motor 23 is provided with: a casing 36; and an external cover 37, and the yoke 26 is secured to the casing 36 by screws 53 serving as a fastening member. The screws 53 are inserted in the respective holes 26d of the yoke 26. The casing 36 is integrally molded of resin material, and the casing 36 is formed with a housing hole 38. The housing hole 38 is coaxial with the center line "A". In addition, as shown in FIG. 8, the casing 36 is formed with: a concave portion 40 in which a worm wheel 39 is housed; and an opening 41 through which the concave portion 40 and the housing hole 38 are communicated with each other. Furthermore, the electric motor 23 has a rotary shaft 42, and the rotary shaft 42 is disposed in the housing hole 38. The rotary shaft 42 is rotatably supported by two shaft bearings 43 and 44, and those bearings are disposed at respective positions different from each other in the direction along the center line "A".

A coupler 45 is formed in the housing hole 38 of the casing 36. The coupler 45 is a coupling member for connecting one end of the rotary shaft 42 and one end of the armature shaft 28 to each other so as to transmit drive power. This coupler 45 is provided with: a first coupling member attached to an end portion of the armature shaft 28 and integrally rotated with the armature shaft 28; and a second coupling member attached to an end portion of the rotary shaft 42 and integrally rotated with the rotary shaft 42. Therefore, the drive power transmission is carried out between the armature shaft 28 and the rotary shaft 42 by an engaging force between the first coupling member and the second coupling member.

In addition, a worm 42a is formed between the shaft bearing 43 and the shaft bearing 44 on an outer periphery of the rotary shaft 42. A gear 39a is formed on an outer periphery of the worm wheel 39, and the gear 39a is engaged with the worm 42a via the opening of the casing 36 with the worm wheel 39 and the rotary shaft 42 being incorporated into the casing 36. The worm wheel 39 is provided with an output shaft 46 as a rotation center, and rotatable with the output shaft 46. The rotary shaft 42 and the worm wheel 39 collectively constitute a reduction mechanism. More specifically, the rotation speed of the worm wheel 39 becomes slower than the rotation speed of the rotary shaft 42 by transmission of drive power from the rotary shaft 42 to the worm wheel 39. The casing 36 is formed with a shaft hole 46a, and the output shaft 46 is rotatably supported by the shaft hole 46a. As shown in FIG. 2, one end of the output shaft 46 is exposed to the outside of the casing 36, and a driving gear 22 is attached to the exposed portion of the output shaft 46. Furthermore, an internal cover 47 for covering the concave portion 40 is provided to the casing 36.

Furthermore, the external cover 37 is detachably attached to the casing 36. With the external cover 37 being in an attached state to the casing 36, a housing chamber 48 is formed between the external cover 37 and the casing 36. In the direction along the center line "A", an occupied area of the housing chamber 48 has a partially overlap with that of the rotary shaft 42. In addition, a control board 49 is provided in the housing chamber 48. The control board 49 is provided with a control circuit 49a which supplies an electric current to the brushes 32. In addition, board-side terminals 49b and 49d connected to the control circuit 49a are provided on the control board 49.

By disposing the control board 49 in the housing chamber 48, and fixing the yoke 26 to the casing 36, the board-side terminal 49b is connected to a contact terminal 51c. In addition, two power-supply-side terminals 54 are respectively connected to the board-side terminals 49d. Furthermore, a socket 49c is provided on the control board 49, and the socket 49c is provided with a terminal (not shown) electrically connected to the control circuit 49a. A connector (not shown) connected to an external power supply (not shown) is connected to the socket 49c, and a terminal provided to the connector and a terminal of the socket 49c are electrically connected to each other.

Figure 7:
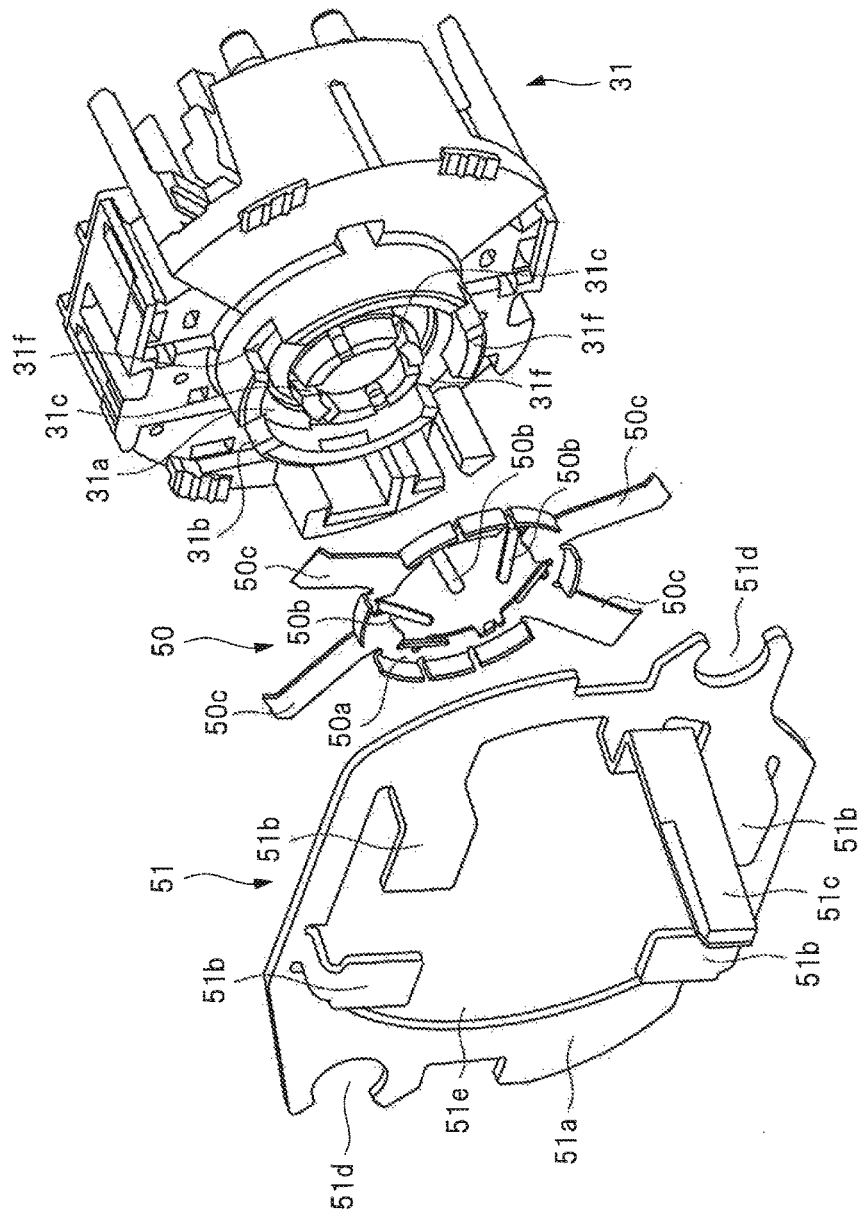
FIG. 7 is an exploded perspective view showing the main section of the electric motor of the present invention.

Next, the following is a description of a grounding structure of the electric motor 23. This grounding structure is a structure for use in releasing electric noise from the contact between the brushes 32 and the commutator 30. First, a grounding terminal 50 which is electrically connected to the shaft bearing 34 is provided as shown in FIGS. 6 and 7. The grounding terminal 50 is molded of conductive metal material, and attached to the brush holder 31. The grounding terminal 50 is disposed so as to surround the periphery of the shaft bearing 34 on the center line "A". That is, in the direction along the center line "A", occupied areas occupied by the grounding terminal 50 and the shaft bearing 34 have a partially overlap with each other.

The grounding terminal 50 is provided with: an annular portion 50a formed into a ring shape; a plurality of internal contact terminals 50b extending inward from the annular portion 50a; and a plurality of external contact terminals 50c extending outward from the annular portion 50a. In the brush holder 31, on an end portion closer to the rotary shaft 42 in the direction along the center line "A", an annular retaining groove 31a having a ring shape is provided, and the annular portion 50a is inserted in the retaining groove 31a. Furthermore, in the brush holder 31, a plurality of cut-out portions 31f are formed along a circumferential direction of the retaining groove 31a with predetermined intervals, and the external contact terminals 50c are inserted in the cut-out portions 31f. The cut-out portions 31f of the brush holder 31 and the external contact terminals 50c of the grounding terminal 50 are incorporated into each other, and they serve as a rotation stopper for preventing the grounding terminal 50 from being rotated around the center line "A" by vibrations or the like at the time of driving the electric motor 23. Furthermore, a plurality of cut-out portions 31c are provided along a circumferential direction in the retaining groove 31a with predetermined intervals. The internal contact terminals 50b are inserted to the cut-out portions 31c so that the internal contact terminals 50b are placed in contact with the outer periphery of the shaft bearing 34.

Furthermore, a contact plate 51 is interpolated between the casing 36 and the yoke 26, and those members are secured to each other via the contact plate 51. The contact plate 51 is attached to the outer periphery of the brush holder 31. That is, the contact plate 51 and the brush holder 31 are arranged so that, when viewed from the direction along the center line "A", occupied areas of those elements have a partially overlap with each other. In addition, the contact plate 51 is molded of metal member having conductivity. The contact plate 51 is provided with: an annular portion 51a formed into a ring shape; a plurality of contact portions 51b extending inward from the annular portion 51a; and a contact terminal 51c extending in the direction along the center line "A" from the annular portion 51a. Since the external contact terminals 50c are placed in contact with the contact portions 51b, and the annular portion 50a is placed in contact with the bottom portion of the retaining groove 31a, the grounding terminal 50 is positioned without being shifted in the direction along the center line "A".

In addition, the contact terminal 51c are placed in contact with the board-side terminal 49b formed on the control board 49. In addition, the annular portion 51a is provided with a plurality of cut-out portions 51d, their positions are different from each other in a circumferential direction, and screws 53 for fixing the yoke 26 and the casing 36 are inserted and tightened to the cut-out portions 51d, the contact plate 51 is secured between the yoke 26 and the casing 36. That is, on a plane perpendicular to the center line "A", the casing 36, the contact plate 51 and the yoke 26 are prevented from being relatively rotated. In this manner, the contact plate 51 and the yoke 26 are secured to each other in a directly-contacted state.

One portion of the brush holder 31 is inserted in the hole 51e of the annular portion 51a, and the brush holder 31 and the contact plate 51 are engaged with each other so that the contact plate 51 is prevented from being rotated around the center line "A". In addition, in the direction along the center line "A", the ends of the brush holder 31 are placed in contact with the contact plate 51 and the yoke 26 so that the brush holder 31 is located in the direction along the center line "A". In addition, when the electric motor 23 is mounted to the vehicle 13, an earth wire (not shown) is provided so as to electrically connect the yoke 26 to one portion of the vehicle body.

The above electric motor 23 has: a first unit in which the armature shaft 28, the armature 29, the shaft bearings 34 and 35, the brush holder 31, the commutator 30, the brushes 32, the contact plate 51, the grounding terminal 50, and the like are attached to the yoke 26; and a second unit in which the rotary shaft 42 and the internal cover 47 are attached to the casing 36, the first and second units are respectively assembled in processes different from each other, and when the first and second units are assembled, the first coupling member attached to the armature shaft 28 and the second coupling member attached to the rotary shaft 42 are coupled to each other. Therefore, by inserting the screw 53 in the hole 26d and tightening it, the first and second units are coupled to each other. At this time, the contact plate 51 is sandwiched between the yoke 26 and the casing 36, and secured by them. Furthermore, when the control board 49 is disposed in the housing chamber 48 and the external cover 37 is attached to the casing 36, the assembling process of the electric motor 23 is complete.

In the above electric motor 23, when an electric current is supplied from the external power supply to the coil 29b via the control circuit 49a of the control board 49, the brushes 32, and the commutator 30, a rotating magnetic field is formed between the permanent magnets 27 and the armature 29, thereby rotating the armature shaft 28. A torque of the armature shaft 28 is transmitted to the rotary shaft 42 via the coupler 45. When the driving gear 22 is rotated in a predetermined direction by transmission of the torque of the rotary shaft 42 to the worm wheel, the roof panel 12 is moved in a rearward direction of the vehicle 13, and the opening 14 is opened. In contrast, when the armature shaft 28 is rotated in a direction opposite to the above-mentioned direction, the driving gear 22 is rotated in the reversed direction to the above-mentioned direction, the roof panel 12 is moved in a forward direction of the vehicle 13, and the opening 14 is closed. In addition, when the electric current to be transmitted from the external power supply to the coil 29b is controlled, the rotation speed of the armature shaft 28 is controlled.

In general, when the commutator 30 are selectively placed in contact with the brushes 32 by rotation of the armature 29, a spark current is generated by switching the contact between the brushes 32 and the commutator 30, and the spark current may result in electric noise (electromagnetic noise). In particular, when the rotation of the armature shaft 28 is started from the stopped state, since an electric current larger than an electric current of the normal state flows instantaneously, electric noise becomes greater than that of the normal state. In addition, electric noise may be generated by unstable follow-up operation of the contact between the commutator 30 and the brushes 32, an excessive load current and the like. Furthermore, an insulation coat film may be formed at the contact between the commutator 30 and the brushes 32 to cause the electrical contact to become instable, electric noise may be generated.

Figure 9:
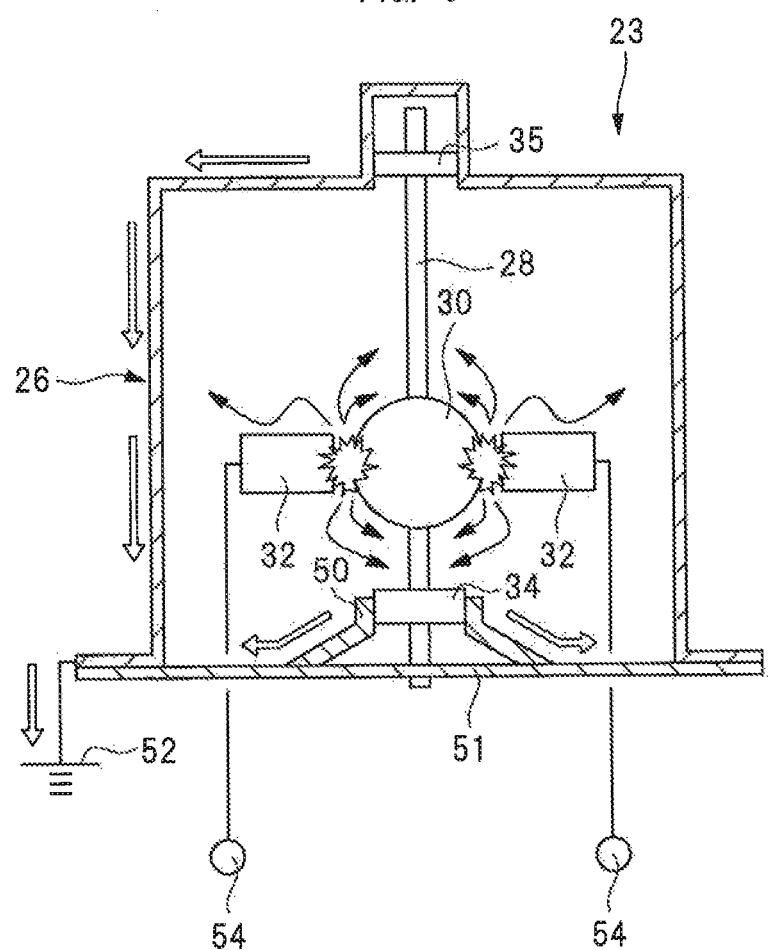
FIG. 9 is a conceptual view showing a radiating path of electric noise in the electric motor of the present invention.

In contrast, in the present embodiment, since electric noise is radiated to the ground 52 in the following manner, the electric noise is prevented from leaking from the electric motor 23. As shown in FIG. 9, the electric noise generated by switching the contact between the brushes 32 and the commutator 30 at the time of rotating the armature 29 is transmitted to the yoke 26 and the armature shaft 28 through the air. Since the yoke 26 is electrically connected to the ground 52, the electric noise transmitted to the yoke 26 is released to the ground 52 without being leaked from the yoke 26, that is, to the outside of the electric motor 23.

After the electric noise is transmitted to the armature shaft 28, the electric noise is propagated through the armature shaft 28 and again radiated as electric noise from the surface of the armature shaft 28. However, the radiated electric noise is released to the ground 52 via the yoke 26 in the same manner as well as the electric noise generated from the contact between the brushes 32 and the commutator 30.

In addition, since the shaft bearings 34 and 35 for supporting the armature shaft 28 are electrically connected to the ground 52 via the yoke 26, the grounding terminal 50, and the contact plate 51, electric noise transmitted from the armature shaft 28 can be released to the ground via the shaft bearing 34 or the shaft bearing 35 for supporting the armature shaft 28.

Therefore, the transmission of electric noise in the armature shaft 28 can be limited to an area between the shaft bearing 34 and the shaft bearing 35, and within an area between a position closer to one end thereof than the shaft bearing 34 and a position closer to the other end thereof than the shaft bearing 35, the electric noise to be radiated from the surface of the armature shaft 28 can be suppressed. In other words, since the shaft bearing 34 and the shaft bearing 35 are connected to the ground 52 with the shaft bearings 34 and 35 being covered with the yoke 26 and the contact plate 51 connected to the ground 52, the electric noise radiated from the surface of the armature shaft 28 between the shaft bearing 34 and the shaft bearing 35 is released to the ground 52 by the yoke 26 and the contact plate 51, while the electric noise propagated through the armature shaft 28 is released to the ground 52 via the shaft bearings 34 and 35, so that it is possible to prevent electric noise from being radiated and diffused from the electric motor 23.

That is, in the present embodiment, as a path for use in releasing electric noise generated by switching the contact between the brushes 32 and the commutators 30 to the ground 52 from the armature shaft 28, two paths in parallel with each other, that is, a releasing path to the ground 52 via the shaft bearing 35, and a releasing path to the ground 52 from the shaft bearing 34 via the grounding terminal 50 and the contact plate 51, are prepared. In particular, by providing a path to the ground 52 via the shaft bearing 34, the grounding terminal 50 and the contact plate 51 from one end of the armature shaft 28, it is possible to prevent electric noise transmitted to the armature shaft 28 from being transmitted to the rotary shaft 42 and diffused from the rotary shaft 42.

With the assumption that the contact between the commutators 30 and the brushes 32 is a noise generating source, the electric motor has a structure for releasing common-mode noise (unnecessary radiation part) to the ground 52 via the shaft bearing 34 closer to the noise generating source. Therefore, it is possible to obtain an effect for reducing electric noise. In addition, a wording "closer to the noise generating source" means that the shaft bearing 34 is closer to the noise generating source than the shaft bearing 35 in the direction along the center line "A".

In addition, in the direction along the center line "A", the distance from the commutator 30 to the shaft bearing 34 is shorter than a distance from the commutator 30 to the shaft bearing 35. Furthermore, a path for use in releasing electric noise from the commutator 30 via the shaft bearing 34, the grounding terminal 50 and the contact plate 51 is shorter than a path for use in releasing electric noise from the commutator 30 via the shaft bearing 35 and the yoke 26. For this reason, it is possible to prevent electric noise from being again radiated (diffused) to the air to stabilize an electric potential during a process allowing electric noise to propagate through the armature shaft 28 between the commutator 30 and the shaft bearing 34. That is, it is possible to enhance an effect for reducing electric noise.

In addition, the armature shaft 28 and the rotary shaft 42 are connected to each other via the coupler 45, electric noise generated from the armature shaft 28 is released to the ground 52 via the shaft bearing 34 disposed at a position closer to the noise generating source than the coupler 45, it becomes possible to suppress electric noise from being again radiated and diffused from the rotary shaft 42 via the coupler.

Furthermore, an occupied area of the rotary shaft 42 has an overlap with that of the control board 49 disposed in the housing chamber 48 in the direction along the center line "A"; however, since electric noise is released to the ground 52 via the shaft bearing 34, electric noise of the armature shaft 28 is prevented from giving undesirable influences to a signal of the control circuit 49a occupying an area having an overlap with that of the rotary shaft 42. In addition, electric noise of the control circuit 49a is released to the contact plate 51 via the board-side terminal 49b and the contact terminal 51c, and released to the ground 52 via the yoke 26 from the contact plate 51.

An antenna (not shown) of an audio apparatus (not shown) may be provided to the roof 13a of the vehicle 13 shown in FIG. 1. Since the electric motor 23 of the present embodiment has a high performance for reducing electric noise, it is possible to prevent electric noise generated in the electric motor 23 from giving undesirable influences to a signal received by the antenna even if the electric motor 23 is placed in the vicinity of the antenna.

Figure 10:
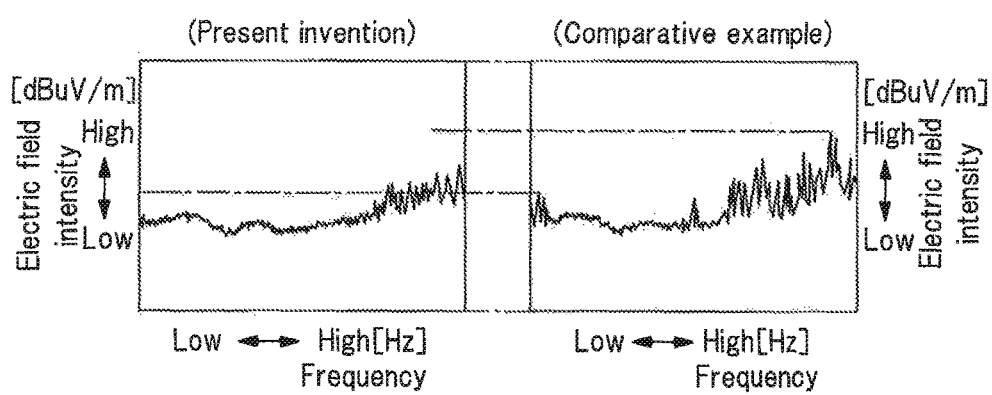
FIG. 10 is a view representing the characteristic of the electric motor of the present invention and the characteristic of an electric motor of a comparative example.

Next, FIG. 10 shows a characteristic of the electric motor 23 of this embodiment (present invention) having the grounding terminal 50 and the contact plate 51 and a characteristic of an electric motor of a comparative example. The electric motor of the comparative example is the same configuration as that of the electric motor 23 of the present embodiment except that the electric motor of the comparative example is provided with the grounding terminal and the connection plate. In FIG. 10, the abscissa axis represents frequency [Hz] and the ordinate axis represents electric field intensity [dBuV/m]. The electric field intensity is measured, for example, in the housing chamber having the control board disposed therein or at a position separated from the electric motor by a predetermined distance. The electric motor is characterized in that, when the frequency of an electric current of a coil thereof is increased under the condition that voltage applied to the electric motor is maintained constant, the rotation speed of the armature shaft becomes higher. When the present embodiment is compared to the comparative example, it is clearly found that the electric field intensity is lower (weaker) in the present embodiment than in the comparative example in both low and high frequency regions.

Furthermore, since the yoke 26 of the electric motor 23 of the present embodiment is used to release electric noise generated from the armature shaft 28 to the ground 52, but an originally-introduced basic element, it is not necessary to provide a dedicated grounded member for releasing electric noise generated from the armature shaft 28 to the ground 52 via the shaft bearing 35. In addition, since the contact plate 51 and the grounding terminal 50 are supported by the brush holder 31, it is not necessary to provide a dedicated element for supporting the contact plate 51 and the grounding terminal 50.

In the electric motor 23 of the present embodiment, since the housing chamber 48 is arranged at a position shifted from a position between the shaft bearing 34 and the shaft bearing 35 in the direction along the center line "A", electric noise radiated to the armature shaft 28 is prevented from being radiated to the rotary shaft 42. Therefore, it is possible to prevent electric noise from being radiated to the housing chamber 48.

In the electric motor 23 of the present embodiment, the grounding terminal 50 and the contact plate 51 are formed so as to surround the outer periphery of the shaft bearing 34. Therefore, it is not necessary to provide a dedicated area in which the grounding terminal 50 and the contact plate 51 are disposed in the direction along the center line "A".

Next, the following is a description about the corresponding relationship between the configuration explained in this embodiment and the configuration of the present invention. The shaft bearing 35 corresponds to the first shaft bearing of the present invention, the shaft bearing 34 corresponds to the second shaft bearing of the present invention, the yoke 26 corresponds to the first grounded member of the present invention, and the contact plate 51, the grounding terminal 50 and the yoke 26 correspond to the second grounded member of the present invention. In addition, the annular portion 50a corresponds to the annular portion of the present invention.

The present invention is not limited by the above embodiment, and it is needless to say that various modifications may be made without departing from the present invention. For example, the yoke is a member in which the armature shaft, the coil, the commutator, the first shaft bearing and the second shaft bearing are housed. For this reason, the yoke may have a hollow structure, and may be formed into a cylindrical shape. In addition, an inward flange is integrally formed on the inner periphery of the yoke formed into a cylindrical shape, and the first shaft bearing may be supported by the inward flange. When the yoke is integrally formed with an inward flange, electric noise from the armature shaft is released to the yoke via the first shaft bearing and the inward flange.

In addition, a sleeve having an inward flange may be attached to the inner periphery of the yoke as a separated member. In this case, the sleeve is made of metal material having conductivity. Therefore, electric noise of the armature shaft is released to the yoke via the sleeve. In addition to the electric motor forming a power source of a sunroof apparatus provided on a vehicle, the electric motor of the present invention includes electric motors for use as power sources for apparatuses such as wiper apparatus, power slide door apparatus, power wind apparatus, and the like to be mounted to a vehicle.

The present invention can be utilized as a power source for driving operation members provided in a vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. An electric motor, comprising:
an armature shaft;
a coil attached to the armature shaft; a commutator attached to the armature shaft, and electrically connected to the coil,
a brush which makes electrical contact with the commutator, and through which electric current is supplied to the commutator;
a rotary shaft axially aligned with the armature shaft, and coupled to the armature shaft so that the armature shaft can transmit drive power to the rotary shaft;
a casing rotatably supporting the rotary shaft;
a first electrically-conductive shaft bearing configured to rotatably support the armature shaft;
a first grounded member incorporated with the first shaft bearing, and electrically connected to a ground conductor;
a second electrically-conductive shaft bearing arranged in a direction along a center line of the armature shaft, different in position from the first shaft bearing, and configured to rotatably support the armature shaft; and
a second grounded member electrically connected to the second shaft bearing, and electrically connected to the ground conductor, wherein
the first grounded member is a yoke in which the armature shaft, the coil, the commutator, the first shaft bearing, and the second shaft bearing are housed,
the second grounded member includes a grounding terminal and a contact plate,
the grounding terminal has:
an annular portion formed so as to surround the second shaft bearing;
a plurality of internal contact portions formed on an inner side of the annular portion, and electrically connected to the second shaft bearing; and
a plurality of external contact portions formed on an outer side of the annular portion, and electrically connected to the ground conductor,
the contact plate is fixed between the casing and the yoke, the contact plate having a plurality of contact portions which make electrical contact with the respective external contact portions of the grounding terminal.

2. The electric motor according to claim 1, wherein the coil and the commutator are arranged between the first and second shaft bearings in a direction along the center line.

3. The electric motor according to claim 1, further comprising: a brush holder housed in the yoke, and configured to retain the brush, wherein the first shaft bearing is supported by the yoke, and the second shaft bearing is supported by the brush holder, and wherein the second grounded member is supported by the brush holder.

4. The electric motor according to claim 1, further comprising:
a storage space which is formed by the casing, and in which a control board configured to control electric current to be supplied to the brush is housed,
wherein the storage space is arranged at a position shifted from a position between the first and second shaft bearings in a direction along the center line.

5. The electric motor according to claim 3, wherein the brush holder has: an annular retaining groove having a ring shape, in which the annular portion of the grounding terminal is fitted, and cut-out portions arranged radially outward and along the annular retaining groove, the external contact portions being fitted in the respective cut-out portions.

* * * * *